Sept. 25, 1956　　　　M. D'ALIBERTI ET AL　　　　2,764,544
SEPTIC TANK
Filed Nov. 16, 1954　　　　　　　　　　　　2 Sheets-Sheet 2
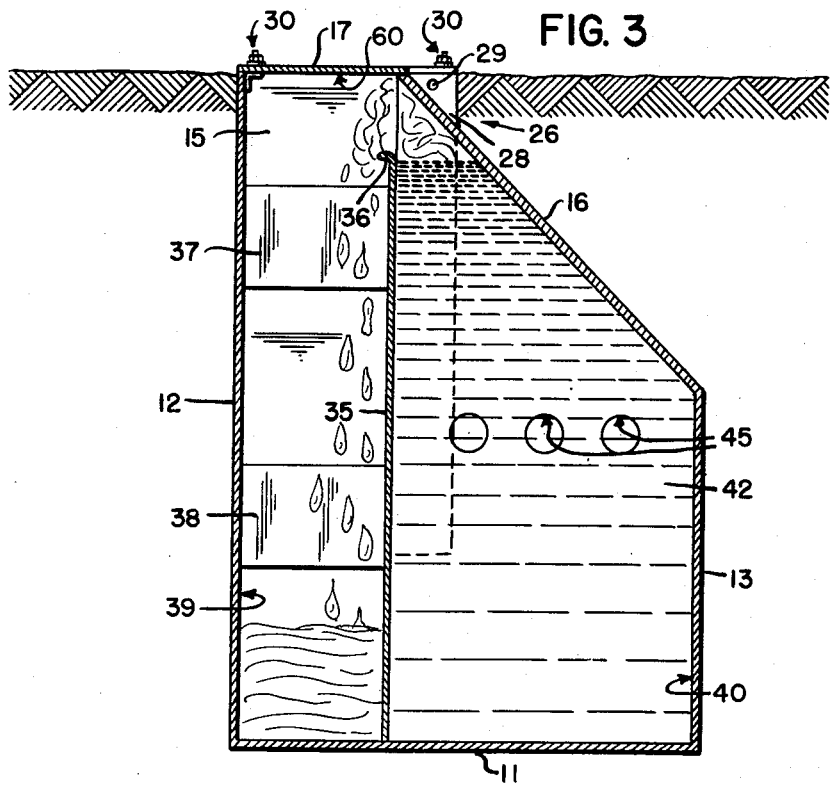
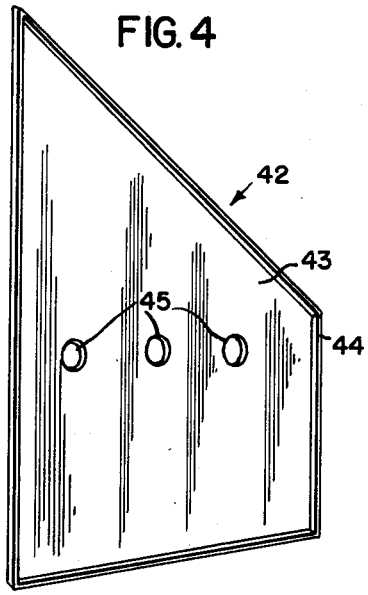
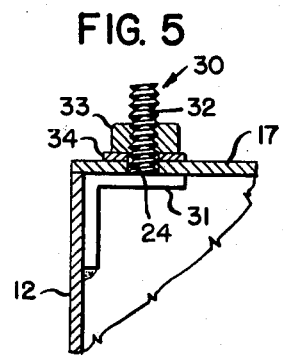
INVENTORS
Michael D'Aliberti
Harry Hartmann
BY Lancaster, Allwine & Rommel
ATTORNEYS United States Patent Office 2,764,544
Patented Sept. 25, 1956

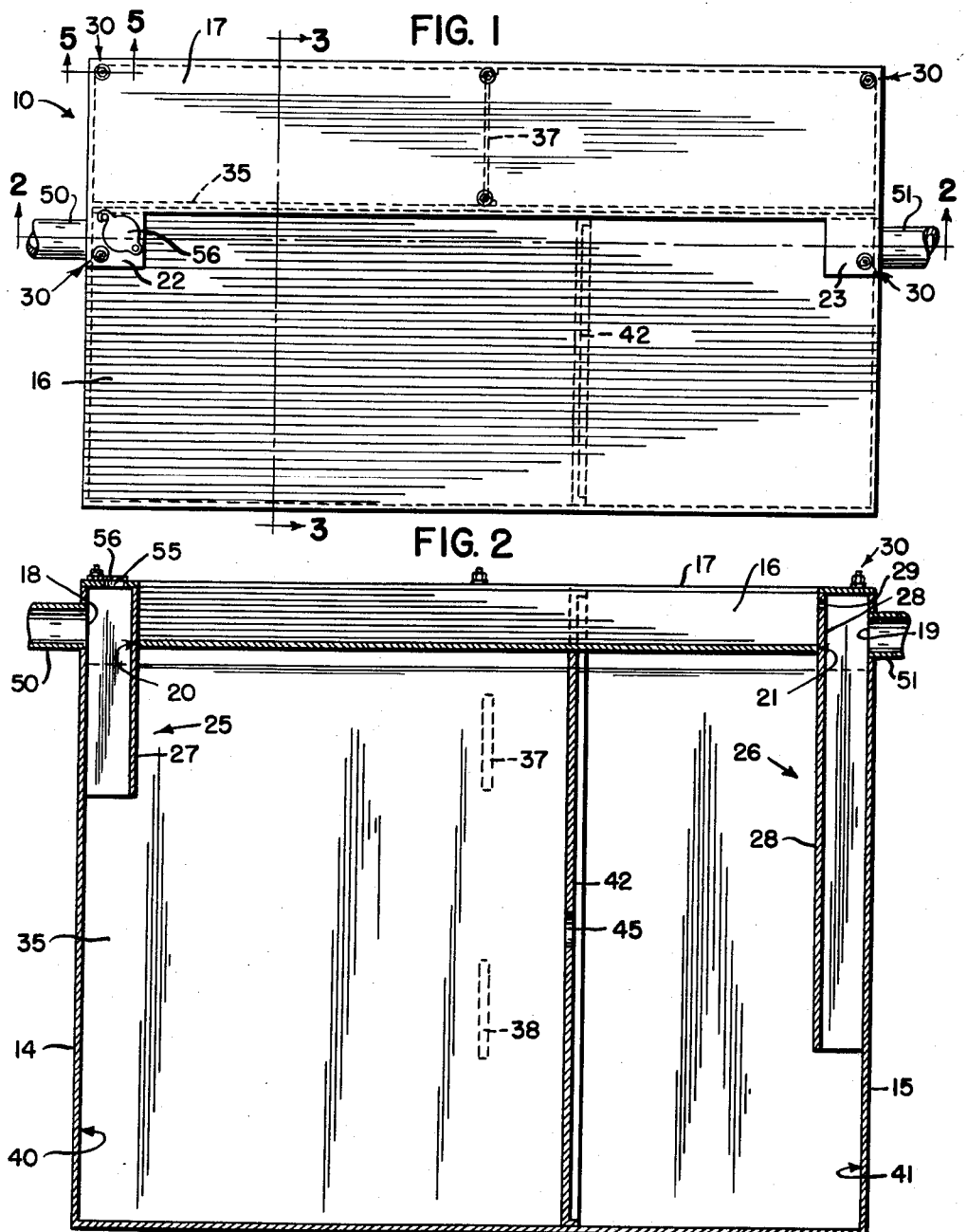

2,764,544

SEPTIC TANK

Michael D'Aliberti, Parsippany, and Harry Hartmann, East Paterson, N. J.; said Hartmann assignor to said D'Aliberti Application November 16, 1954, Serial No. 469,177

6 Claims. (Cl. 210—6)

This invention relates to septic tank construction.

In United States Patent No. 2,621,157, dated December 9, 1952 for a septic tank, there was disclosed guide means for causing sludge, rising in a centrally-disposed passage chamber, to flow over the upper edge of the wall of the chamber and drop, by gravity, into a sludge chamber. This guide means is removable, is disposed below the tank closure, was taken out before the sludge was to be removed and the guide means then replaced.

An important object of this invention is to provide a septic tank in which an inclined upper wall and a removable closure, in conjunction with the upper edge of a partition forming an inner wall of the sludge chamber provide means to guide the sludge so that it will flow over this upper edge and drop, by gravity, into a sludge chamber directly below the closure. Thus, the upper wall and closure have dual functions.

Another important object is to provide a septic tank as described in which the inclined upper wall is not removed when the accumulated sludge is removed and, consequently, the labor of removing the sludge guide means of the United States patent, referred to above, is eliminated.

Still another important object is to provide a septic tank which may be quite narrow, since it includes but one sludge chamber and the tank will occupy less room than tanks having sludge chambers disposed at either side of a central passage chamber.

Another important object is to provide a septic tank in which the below-ground portion of the upper surface of the inclined wall of the tank slopes downwardly, is free of projections and is adapted to shed water so that disintegration of the wall by the action of pocketed water will not occur.

Yet another important object is to provide a septic tank in which the exposed or above-ground portions thereof are quite small and much less than the area of the bottom of the tank.

An additional important object is to provide a septic tank in which certain baffles have other functions as well.

Other objects and advantages of the invention will be apparent during the course of the following detailed description of the invention, taken in connection with the accompanying drawings, forming portions of this disclosure, and in which drawings:

Fig. 1 is a top plan of the septic tank with certain structure within the tank shown in dotted lines.

Fig. 2 is a vertical section, substantially on the line 2—2 of Fig. 1, the tank being shown empty.

Fig. 3 is a transverse section, substantially on the line 3—3 of Fig. 1 with the tank in operation.

Fig. 4 is a perspective view of a transverse partition of the tank.

Fig. 5 is a fragmentary section, substantially on the line 5—5 of Fig. 1, showing closure fastener means for the closure of the tank.

In the drawings, wherein for the purpose of illustration is shown a preferred embodiment of the invention and wherein similar reference characters designate corresponding parts throughout the several views, the septic tank is shown to include a container 10, having a bottom wall 11, upwardly-extending side walls 12 and 13, end walls 14 and 15, and inclined wall 16 which partakes partly the functions of a side wall and an upper wall, and a removable closure 17. The walls and closure may be of any suitable material or materials, such as metal, concrete, synthetic hardened plastic or combinations of these.

The bottom wall 11 and side walls 12 and 13 are preferably rectangular with the wall 13 less in weight than the opposite wall 12.

Each end wall is five-edged and joins the bottom and side walls 11, 12 and 13 respectively, has a sloping edge sloping upwardly toward the wall 12, and adapted to join an edge of the wall 16, and a substantially flat upper edge, removably covered by the closure 17. In addition, the walls 14 and 15 have inlet and outlet openings 18 and 19 respectively, preferably just below the upper end of the sloping edges, for the accommodation of inlet and outlet means to be described below.

The wall 16, which is preferably flat, joins the upper edge of the wall 13 and the sloping edges of the walls 14 and 15 and provides an upper edge, preferably removably covered by the closure 17. At its uppermost corners, the wall 16 is provided with cut-outs 20 and 21 to accommodate portions of the baffle and brace means 25 and 26 to be subsequently described.

At two of its corners the closure 17, which is preferably rectangular, flat and horizontally disposed, is provided with outwardly projecting portions 22 and 23 adapted to close the upper ends of the baffle and brace means 25 and 26 and suitable openings (such as the opening 24 of Fig. 5) are provided for lugs 31 of the closure fastening means 30 to be later described.

Baffle and brace means 25 and 26 are provided at the inlet and outlet openings 18 and 19 and disposed within the container 10. Each preferably comprises a substantially vertically-disposed rigid tube which may be made up of a wall portion 27 or 28 facing and spaced a short distance from the walls 14 and 15 respectively and spaced-apart wall portions joining the first-named wall portions and secured to the inner faces of the walls 14 and 15. The wall portions 27 and 28 also face their associated openings 18 and 19 and the wall portion 28 may be provided with a small exit opening 29 adjacent its upper end. The tubes are open at their ends and the baffle means 26, which may be termed the outlet baffle means, is considerably longer than the means 25, which may be termed the inlet baffle and brace means. It will be noted, in Figs. 2 and 3, that the wall portions mentioned project outwardly of the upper wall 16 and their upper ends are preferably in the same horizontal plane as is the upper end of the wall 12. With this arrangement, material entering the inlet opening 18 is baffled downwardly and out the lower end of the baffle and brace means 25 and material entering the lower end of the baffle and brace means 26 will flow out the outlet opening 19.

Closure fastening means 30 for the closure 17 is provided and preferably comprises a plurality of brackets (such as the inverted L-shaped bracket 31 of Fig. 5) with their upwardly-extending portions welded or otherwise rigidly secured to the inner face of the wall 12 at its upper corners and to the inner faces of the end walls 14 and 15 to be disposed within the tubes of the baffle means. The horizontally-disposed portions of these brackets 30 are provided with upwardly-extending screw threaded lugs 32 to extend through the openings 24 in the closure 17 and project upwardly therefrom. Suitable nuts 33 may be provided for the lugs 32 with gaskets 34 disposed between the nuts and the upper face of the closure 17.

The interior of the container 10 is divided longitudinally by an upwardly-extending partition wall 35. This wall is disposed with its ends secured, as by welding, to the end walls 14 and 15 and braced by the baffle means 25 and 26 since the partition wall 35 is in face contact with a wall of each as may be appreciated in Figs. 1 and 3. On its other side, the partition is braced by suitable braces 37 and 38, preferably centrally disposed, which are suitably secured thereto and to the end wall 12, as by welding. The upper end of the partition wall 35 is curved, as at 36, forming an outwardly extending lip. It will be noted, particularly in Fig. 3, that the partition wall effects the provision of a sludge chamber or reservoir 39 with its mouth immediately below the closure 17 having its bottom covering preferably substantially one-third the area of the bottom wall 11. It will be noted, as in Fig. 3, that the inclined wall ends at its upper edge extended to the vertical plane of the partition wall 35.

Dividing the rest of the interior of the container 10 into a sewerage inlet and treating chamber and reservoir 40 and a sewerage treating or outlet chamber or reservoir 41 is a transversely disposed baffle or partition wall 42, best shown in Fig. 4. This baffle 42 preferably comprises an upwardly-extending plate 43 having a preferably continuous border flange 44 along its four edges to be secured, as by welding, to the walls 11, 13, 16 and 35. The plate 43 is provided with a suitable number (as three) spaced-apart openings 45 so disposed that they are above the lower mouth of the outlet baffle means 26.

For the inlet opening 18 we prefer to provide a conduit 50 leading thereto and secured to the wall 14 in any approved way and for the outlet opening 19, we prefer to provide a conduit 51 leading therefrom and this may be secured to the wall 15 in any preferred way.

Since the inlet baffle means 25 may become clogged at times, we prefer to provide an opening 55 in the outwardly-projecting portion 22, with its central axis coincident with the longitudinal axis of the passageway through the means 25, and with the opening 55 closed by a suitable movable closure 56. Upon uncovering the opening 55 and inserting a long slender member as a pole or stick, the clogged baffle means 25 may be freed.

Referring mainly to Fig. 3, it will be noted that the upper portions of the inclined side wall 16 and the end wall 12, together with the upper portions of the end walls 14 and 15 and the closure 17 define a sludge passageway or transfer zone 60 for the flow of sludge from the inlet chamber 40 and, in a much more limited way from the outlet chamber 40 to the sludge chamber 39, guided in its flow principally by the inclined side wall 16. In the chamber 39, the sludge gradually accumulates, and may be removed, after removal of the closure 17. Insofar as the septic tank is concerned, removal of the sludge may be made upon the removal of the closure and no part of the sludge guiding means need be moved.

Sludge is often sluggish and, unless it is urged to flow over a wall into a sludge chamber, it will pile up upon the surface of the liquid in a septic tank in a dense mass, shutting off air and gradually preventing proper functioning of the tank. As the sludge begins to accumulate upon the surface of the liquid within the inlet chamber 40, it will contact the sloping surface of the wall 16, and sliding along this surface, will readily flow over the lip 36. In the event the sludge accumulates quickly, due to rapid bacterial action upon the sewage, it will now be obvious that the abrupt change in the direction of the flow, caused by contact areas at and adjacent the juncture of the inclined wall and the closure, will break the sludge mass so it will more readily drop into the sludge chamber.

Various changes may be made to the form of the invention herein shown and described without departing from the spirit of the invention or scope of the claims.

What is claimed is:

1. A septic tank including outer walls, an upper closure and partition walls defining a sludge chamber, a sewage inlet chamber, a sewage outlet chamber and a sludge passageway, one of said outer walls being an upper inclined wall, extending toward said closure and providing an inclined surface to guide the sludge from said sewage inlet and sewage outlet chambers through said sludge passageway into said sludge chamber, said sludge passageway being above said chambers and below the upper portion of said upper inclined wall.

2. A septic tank according to claim 1 characterized in that said upper inclined wall has its upper edge extended to the vertical plane of said partition wall.

3. A septic tank according to claim 1 characterized in that said closure is above said sludge chamber only.

4. A septic tank according to claim 1 characterized in that said upper inclined wall has its upper edge extended to the vertical plane of said partition wall, and said closure is horizontally disposed and extends to said upper edge.

5. A septic tank according to claim 1 characterized in that said inclined wall is substantially flat and said closure is substantially horizontally disposed and extends to said inclined wall and forms an obtuse angle therewith.

6. A septic tank including outer walls, a closure and a partition wall, all defining a sludge chamber, a sewage inlet and treating chamber, a sewage treating and outlet chamber and a sludge passageway from said sewage treating chambers to said sludge chamber, two of said outer walls being oppositely-disposed upwardly-extending walls, one being provided with an inlet opening to said sewage inlet and treating chamber and the other being provided with an outlet opening from said sewage treating outlet chamber, and a tubular baffle means within one of said sewage treating chambers, including a baffle wall spaced from and facing one of said openings and extending above the horizontal plane of said partition wall, and other baffle walls extending from said baffle wall and secured to the upwardly-extending wall containing said one of said openings, said partition wall being secured to said upwardly-extending walls and having a portion in face contact with one of said other baffle walls to provide a brace for said partition wall.

References Cited in the file of this patent

UNITED STATES PATENTS

| | | |
|---|---|---|
| 933,121 | Schofield | Sept. 7, 1909 |
| 1,529,019 | Evans | Mar. 10, 1925 |
| 2,279,813 | Bent | Apr. 14, 1942 |
| 2,621,157 | D'Aliberti | Dec. 9, 1952 |